UNITED STATES PATENT OFFICE.

HORACE W. LASH, OF CLEVELAND, OHIO.

PROCESS OF REDUCING IRON OXIDS.

No. 860,922.　　　　Specification of Letters Patent.　　　　Patented July 23, 1907.

Application filed December 28, 1906. Serial No. 349,812.

*To all whom it may concern:*

Be it known that I, HORACE W. LASH, a citizen of the United States, residing at Cleveland, in the county of Cuyahoga and State of Ohio, have invented a certain new and useful Improvement in the Process of Reducing Iron Oxids, of which the following is a full, clear, and exact description.

My invention relates to the reducing of iron oxids in connection with finely divided cast or pig iron, either into finished steel or into a partially refined condition suitable for the making of castings, or finished iron or steel by further treatment.

In carrying out my invention I use finely ground or comminuted oxid of iron, such as iron sand or scale, and mix the same with finely divided cast or pig iron and a carbonaceous material as coke. The several ingredients may if preferred, receive their final comminution during the mixing process by being ground together during the mixing.

The iron oxid which I employ may be obtained from any of the ordinary ores such as the sand ores of the St. Lawrence and New Zealand, and I find that the association of such substances as titanium oxid does not interfere with the process. The essential thing is that the iron oxid shall be in a finely divided condition in the mixture.

The cast or pig iron may be obtained from any supply convenient, but it is necessary that this addition to the mixture shall be distinctly of that quality of iron commonly designated as cast or pig iron, as distinguished from the ordinary run of scrap, wrought iron or steel, since it is important that it contain a high percentage of metalloids or oxidizable metals, such as manganese, capable of uniting with the oxygen of the ore.

The free carbonaceous material forming part of the mixture is preferably in the form of ordinary coke and is finely ground, as are the other portions of the charge mixture.

In addition to the above mentioned ingredients I find it advantageous in some cases to add a readily combustible material, such as sawdust or crushed bituminous coal which shall be consumed during the early stages of the smelting operation and thus leave the mass porous so that the smelting may proceed with greater rapidity. The combustion of the sawdust or bituminous coal is not, of course, perfect under such conditions and has the effect of coating the particles of iron oxid with carbon, and it may be that this action adds somewhat to the effectiveness of the mixture.

I usually add fluxes of the ordinary kind, as lime and fluorspar, varied to suit the different grades of ore. It is however customary to add such fluxes to smelting mixtures and I do not claim any novelty for this feature of my mixture.

When it is desired that the mixture shall be handled in the form of lumps or briquets, any of the ordinary binders, such as pitch or oil, may be employed.

The mixture described consisting of iron oxid, carbonaceous material and pig or cast iron high in metalloids or oxidizable metals, such as manganese, is charged directly upon the hearth of a metallurgical or regenerative gas furnace, such as is commonly used in the manufacture of open hearth steel. The heat is then supplied in the ordinary way and in the course of a few hours it is found that the entire quantity of iron added as iron oxid is reduced to metallic form, forming a bath with the metallic iron added in the form of pig or cast iron.

This remarkably simple and effective method of smelting the finely divided oxids of iron, which it has hitherto been thought impossible to handle owing to the fact that they are too light for blast furnace smelting, is best explained as follows. The action of the pig or cast iron in the finely divided mixture is two-fold in its character:—First and primarily the pig iron contains a high percentage of metalloids and, generally, manganese, which elements, upon the fusion of the iron, are presented to the oxid in the most intimate and effective condition possible and become active and ready reducing agents. Secondly, the fused pig iron seems to act simultaneously as a solvent for some of the free carbon and as an enveloping coat for the individual particles of oxid, thus bringing such dissolved carbon into intimate association with the oxid to supplement the effect of the metalloids already contained in the pig iron, in their reducing action. The free carbonaceous material should be present in sufficient quantity to insure the proper carburization of the smelted metal so as to maintain it in a fusible condition and also sufficient to protect the mixture against atmospheric oxidation.

The presentation of the reducing agents to the oxids of iron through the medium of the fused metal is so effective that although the proportions may not, owing to certain inevitable losses, be brought to the theoretical limits necessary for simple reduction of the oxids, the quantity of cast-iron necessary for practical work is so small that it need never be greater than the weight of the oxid under treatment and may be considerably less, successful results having been obtained where the cast-iron was not more than one fourth the weight of the iron oxid. The quantity of free carbonaceous material used runs from about one sixth to one tenth, by weight, of the iron oxid, being controlled by the conditions under which the mixture is to be smelted.

In practice I have found the following proportions to produce a satisfactory mixture for smelting:

|  | Mixture No. 1. | Mixture No. 2. | Mixture No. 3. |
|---|---|---|---|
| Ore | 16.00# | 12.00# | 18.00# |
| Cast-iron | 16.00 | 6.00 | 7.00 |
| Carbon | 2.00 | 2.00 | 2.00 |
| Limestone | .50 | .25 | .25 |
| Fluorspar | .50 | .25 | .25 |
| Sawdust | .50 | .50 | .50 |
|  | 35.50 | 21.00 | 28.00 |

These proportions may, of course, be varied within obvious limits, so long as the essential characteristics outlined in the preceding portion of the specification obtain.

After the reduction of the oxid and the fusion takes place, the refining operation may be carried on to produce finished steel, after which the bath may be drawn off in the usual way and cast into ingots or other desired form, the metal may be tapped off in a partially refined condition giving a product suitable for the manufacture of castings, or finished iron or steel by further treatment.

The unique feature of my mixture and procedure is the utilization of the metalloids and oxidizable metals such as manganese, in the cast or pig iron, to effect the reduction of the finely divided iron or oxid.

The action and effectiveness of cast-iron in this process is above outlined and the function of the carbonaceous material in assisting the action is made clear, and I have endeavored to clearly distinguish the same from the old cementation processes and prior methods in which iron oxid was used simply as a refining or decarburizing agent. In none of these is found the idea of using finely divided iron oxid as the source of the iron bath in a smelting operation.

Having thus described my invention, I claim:

1. The method of reducing iron oxids, consisting in mixing finely divided iron high in metalloids with finely divided iron oxid and finely divided carbonaceous material, charging the mixture upon the hearth of a furnace, and melting down and refining the same; substantially as described.

2. The method of reducing iron oxids, consisting in intimately mixing finely divided cast iron with finely ground oxid of iron, carbonaceous materials, and fluxing materials, charging the same directly upon the hearth of a furnace, and then melting down and refining the same; substantially as described.

3. The method of reducing iron oxids, consisting in charging upon the hearth of a furnace a mixture of oxid of iron, finely divided cast iron, and finely ground carbonaceous material and fluxing materials, substantially in the proportions above specified, and then melting down and refining the charge; substantially as described.

In testimony whereof, I hereunto affix my signature in the presence of two witnesses:

HORACE W. LASH.

Witnesses:
J. M. WOODWARD,
E. B. GILCHRIST.